United States Patent
Lisec

(10) Patent No.: US 7,207,250 B2
(45) Date of Patent: Apr. 24, 2007

(54) PROCESS AND DEVICE FOR MOVING AND POSITIONING SHEETS OF GLASS

(76) Inventor: Peter Lisec, Bahnhofstrasse 34, A-3363, Amstetten-Hausmening (AT)

(*) Notice: Subject to any disclaimer, the term of this patent is extended or adjusted under 35 U.S.C. 154(b) by 0 days.

(21) Appl. No.: 10/469,291

(22) PCT Filed: Jan. 9, 2003

(86) PCT No.: PCT/AT03/00006

§ 371 (c)(1), (2), (4) Date: Jun. 7, 2004

(87) PCT Pub. No.: WO2004/035493

PCT Pub. Date: Apr. 29, 2004

(65) Prior Publication Data

US 2004/0232188 A1   Nov. 25, 2004

(30) Foreign Application Priority Data

Oct. 4, 2002  (EP) ................ 02450224

(51) Int. Cl.
*B65H 35/00* (2006.01)
*B26F 3/00* (2006.01)

(52) U.S. Cl. .............. 83/152; 83/155.1; 83/319; 83/365; 83/879; 65/174; 225/2; 225/96.5; 225/103; 414/752.1

(58) Field of Classification Search ............ 83/13, 83/885, 879, 175, 404, 405, 455, 468.2, 468.7, 83/882, 49, 56, 365, 565, 925, 940, 152, 83/153, 319, 177.1, 55.1, 318, 567; 225/1, 225/96.5, 103, 2; 65/158, 174; 414/752.1; 144/245.6; 156/468, 107, 109, 486, 522, 156/523
See application file for complete search history.

(56) References Cited

U.S. PATENT DOCUMENTS

| 3,033,382 | A | * | 5/1962 | Noble et al. ................ 212/281 |
| 3,165,017 | A | * | 1/1965 | Pierre .......................... 83/880 |
| 3,253,756 | A | * | 5/1966 | Haley et al. ................... 225/2 |
| 3,279,664 | A | * | 10/1966 | Lynch ....................... 225/96.5 |
| 3,452,791 | A | * | 7/1969 | Roberts, Jr. ............. 144/24.16 |
| 3,543,978 | A | * | 12/1970 | Feillet ........................... 225/2 |
| 3,665,148 | A | * | 5/1972 | Yasenchak et al. ...... 219/124.4 |
| 3,808,992 | A | * | 5/1974 | Mall ..................... 112/470.18 |
| 4,181,054 | A | * | 1/1980 | Striebig ...................... 83/153 |
| 4,394,894 | A | * | 7/1983 | Gemmani ............... 198/339.1 |
| 4,667,555 | A | * | 5/1987 | Lisec .......................... 83/879 |
| 4,702,663 | A | * | 10/1987 | Mischke et al. ........... 414/618 |
| 5,036,736 | A | * | 8/1991 | Hillock et al. ................ 83/23 |
| 5,398,579 | A | * | 3/1995 | Bando ......................... 83/879 |
| 5,873,922 | A | * | 2/1999 | Lisec .......................... 65/112 |
| 5,944,244 | A | * | 8/1999 | Lisec ....................... 225/96.5 |
| 6,796,588 | B2 | * | 9/2004 | Hsieh ........................... 294/65 |
| 2001/0017045 | A1 | * | 8/2001 | Mattio et al. ................ 65/174 |
| 2003/0015001 | A1 | * | 1/2003 | Tamburini et al. ........... 65/158 |

FOREIGN PATENT DOCUMENTS

| EP | 0 192 290 | 8/1986 |
| EP | 0 564 758 | 10/1993 |
| WO | 95/16640 | 6/1995 |

OTHER PUBLICATIONS

Patent Abstracts of Japan, vol. 2000, No. 13, Feb. 5, 2001 -& JP 2000 296435 A (Central Glass CO LTD), Oct. 24, 2000 Zusammenfassung: Abbildung 1.
Patent Abstracts of Japan, vol. 017, No. 190 (C-1048), Apr. 14, 1993 -& JP 04 342431 A (Central Glass CO LTD), Nov. 27, 1992 Zusammenfassung; Abbildungen 3-5.

* cited by examiner

*Primary Examiner*—Boyer D. Ashley
*Assistant Examiner*—Ghassem Alie
(74) *Attorney, Agent, or Firm*—Young & Thompson

(57) ABSTRACT

In a system for cutting glass sheets into shapes there is at least one cutting site (A, B). In order to align the glass sheet which is to be cut or the glass sheet shape into a defined position, on the edge of the tables I and II there are contact edges (21, 44, 45). In order to move the glass sheets and the glass sheet shapes into contact with the contact edges (21, 44, 45) the tables I, II are aligned sloping down toward the contact edges (21, 44, 45) so that the glass sheets and glass sheet shapes slide on air cushions produced between the glass sheets or glass sheet shapes and the tables (I, II) in contact with the contact edges (21, 44, 45). The glass sheets or glass sheet shapes which adjoin the contact edges (21, 45) are coupled by force-fit to the conveyor belts (20) which are provided in the area of the contact edges (21, 45) and then moved to the cutting site (A, B) which is located following the table (I, II). When there are two cutting sites (A, B) the table (11) can be inclined between the two cutting sites (A, B) such that the intersection point which is used as the reference point (43) between the two contact edges (44, 45) is the lowest point of the table (II).

6 Claims, 5 Drawing Sheets

PROCESS AND DEVICE FOR MOVING AND POSITIONING SHEETS OF GLASS

The invention relates to a process and a device for moving and positioning glass sheets in conjunction with the cutting of sheets of glass (glass cutting). The glass sheets under consideration here are for example float glass and laminated glass. In known devices for cutting glass sheets ("glass cutting tables") as are known for example from EP 0 564 758 A, to move and position the glass sheets conveyor belts and/or conveyor rollers are used which are recessed into the support surfaces of the glass cutting tables and which are raised over the support surface when a glass sheet is to be transported. These conveyor belts are also known in devices for cutting laminated glass (WO 95/16640 A=EP 0 708 741 A).

To move glass sheets on glass cutting tables, providing drivers for the glass sheets on the cutting bridge is furthermore known. Vacuums heads mounted on the cutting bridge (EP 0 192 290 A), or drivers which can be placed on one edge of a glass sheet (US-A-5,944,244) are known.

Glass sheets must be positioned on glass cutting tables not only accurately, but also promptly. This is not possible with the known devices or is possible only with considerable effort. Here it must be considered that glass sheets with a weight of up to 1000 kg (laminated glass) must be moved and positioned accurately. Furthermore, it can be considered that the glass sheets on the glass cutting tables must be moved in different directions, for example to make X and Y cuts.

The object of the invention is to devise a process and a device of the initially mentioned type which allow accurate, prompt and simple movement of glass sheets (float glass and laminated glass) in their positioning and which do not require complex conveying means for moving and positioning the glass sheets to be cut or glass sheet shapes to be further cut. This object is achieved as claimed in the invention with a process which has the features of claim 1.

With respect to the device, this object is achieved with a device which has the features of the main apparatus claim.

Preferred and advantageous developments of the process as claimed in the invention on the one hand and the device as claimed in the invention on the other are the subject matter of the dependent claims.

The process as claimed in the invention takes place such that the support surface on which the glass sheet which is to be moved lies is tilted such that it slopes in the direction to a defined reference line (contact edge) and the glass sheet which lies on it slides up to this reference line (contact edge). The glass sheet or a glass sheet shape are then positioned by adjoining at least one reference line (contact edge).

By choosing the angle of the tilt of the support surface and/or by choosing the coefficient of friction between the glass sheet and the surface of the support surface, glass sheets of varied size and weight can be taken into account.

In one preferred embodiment the glass sheets slide on an air cushion which is formed between the support surface and the glass sheet. An air cushion as the sliding surface for glass sheets also has the advantage that the friction between the glass sheet and the support surface can be set by setting the pressure with which air flows out of the air cushion openings in the support surface to the value which is desired at the time and if necessary can be changed during the movement of the glass sheet. This offers for example the possibility of reducing the friction at the start of the movement of the glass sheet and of increasing the friction before the end of the movement of the glass sheet, for example when it is approaching the reference line (contact edge) by lowering the pressure of the air which forms the air cushion.

In the procedure as claimed in the invention in one embodiment a glass sheet which rests on at least one contact edge which forms the reference line is moved by force-fitted coupling of the glass sheet to a conveyor means by defined distances in order to feed it in a defined manner to the cutting point at which the glass sheet is cut (scratched).

The process as claimed in the invention also makes it possible to continue to move and position the cut glass sheets, especially parts of glass sheets which are obtained after cutting the traverses (X cuts) and to feed them accurately positioned to the next cutting point where Y cuts are made.

The glass sheet shapes are positioned preferably such that a glass sheet shape is moved by inclining the support surface after the first cutting site with one of its corners at a reference point which is defined for example by two contact edges which are at an angle of 90° to one another. To the extent the device is affected, the support surfaces before and after the cutting devices, therefore the feed table of the first cutting device (for X cuts), the second table with which the glass sheet shapes after the first cut (X cut) are moved to the second cutting device (for Y cuts), and finally the delivery table in the direction to at least one contact edge is tilted down or optionally is made additionally to be able to tilt so that they are aligned at an angle to the horizontal.

Furthermore in the device as claimed in the invention, on the edge of each table at least one contact edge is formed as the reference line which is generally aligned normally to the downstream cutting site. This reference line (contact edge) is for example a conveyor belt. A glass sheet which is to be moved by the conveyor belt along the contact edge or a glass sheet shape is coupled to the respective conveyor belt. This coupling takes place for example via at least one coupling suction head which is movably guided on a rail parallel to the conveyor belt and can be loaded in the direction to the conveyor belt after being applied to the glass sheet, so that between the conveyor belt and the glass sheet frictional adherence is formed which makes it possible to move the glass sheet by sliding using the conveyor belt on the support surface. There is no separate drive for the carriage which bears the coupling suction head to move it along the contact edge.

Other details and features as well as advantages of the invention derive from the following description of one preferred embodiment with respect to the drawings in which a cutting unit (for laminated glass) is shown.

Figure 3:
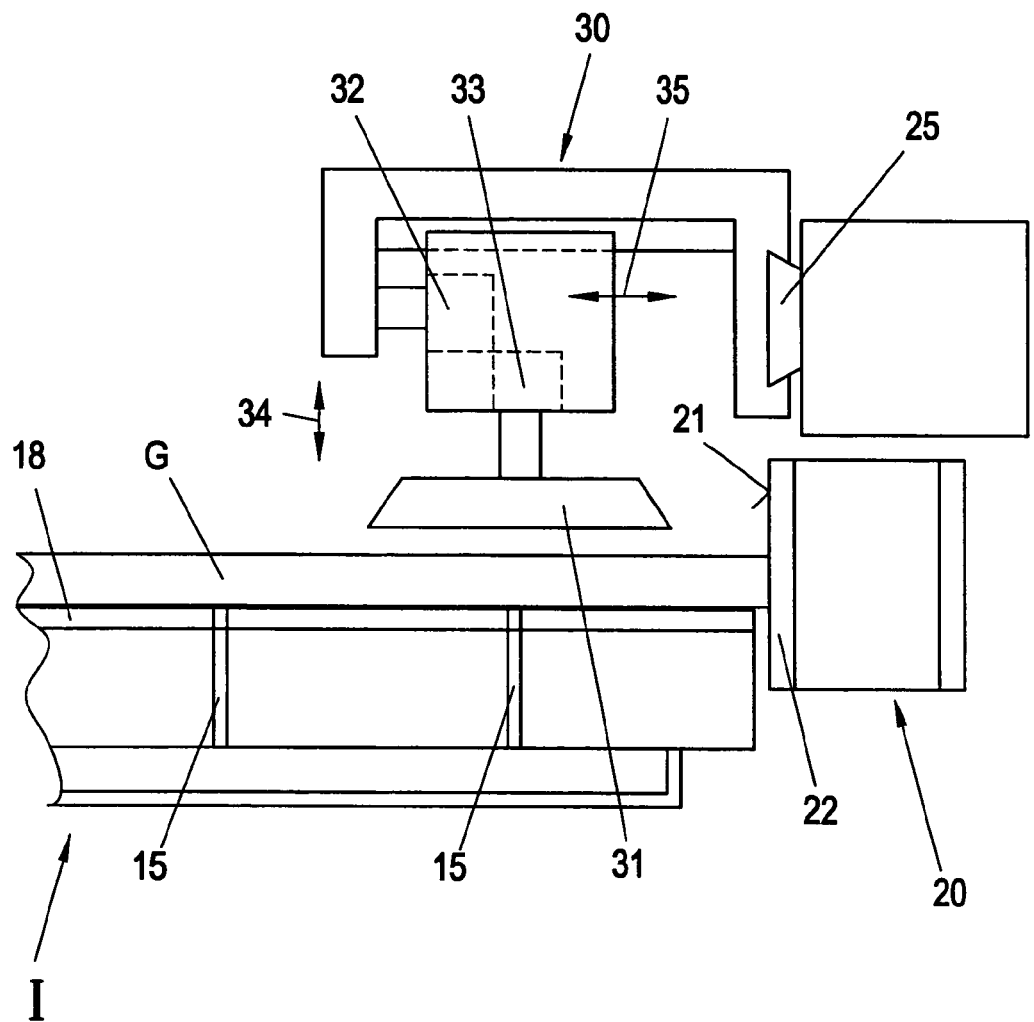
Figure 4:
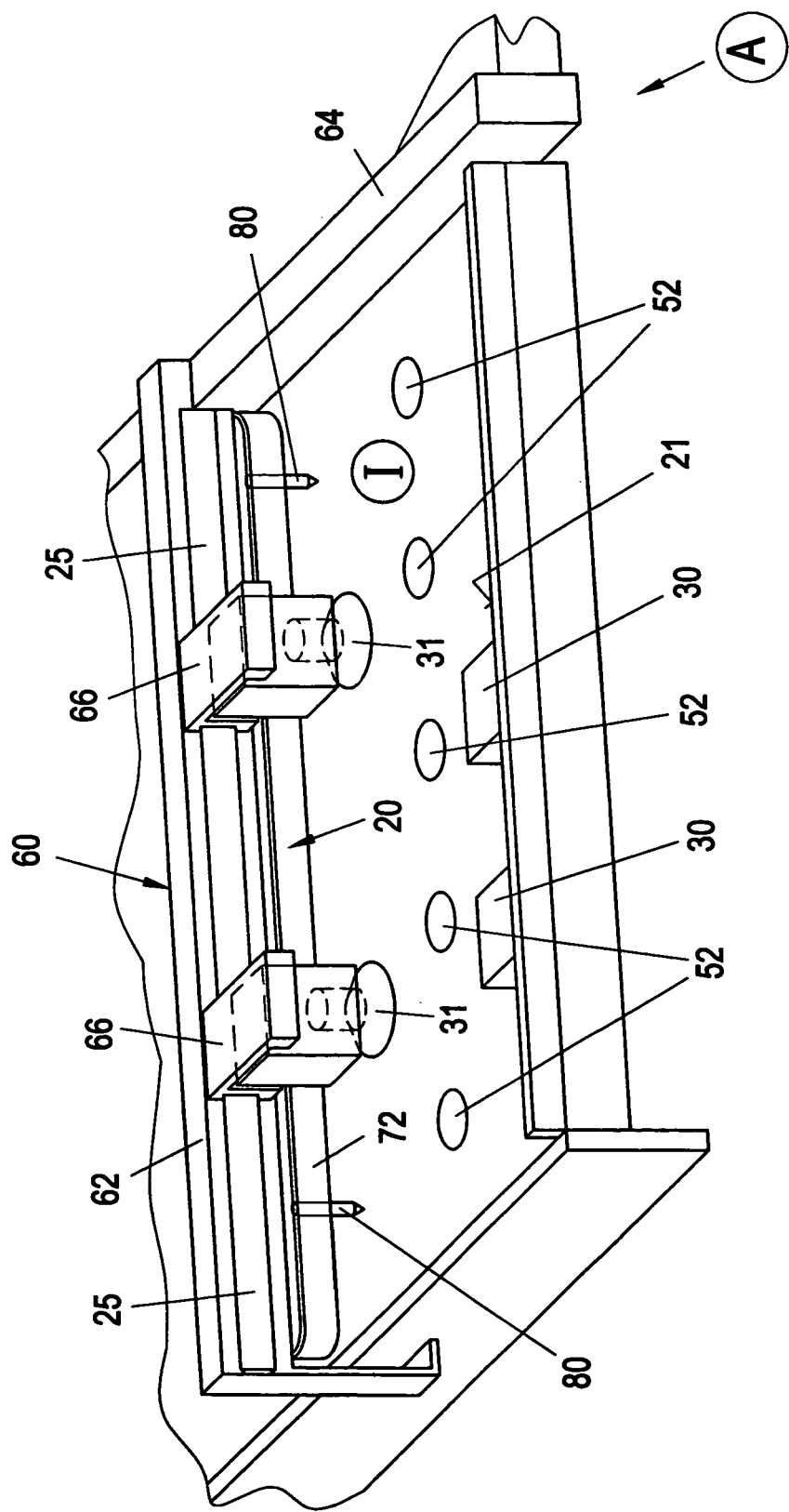
Figure 5:
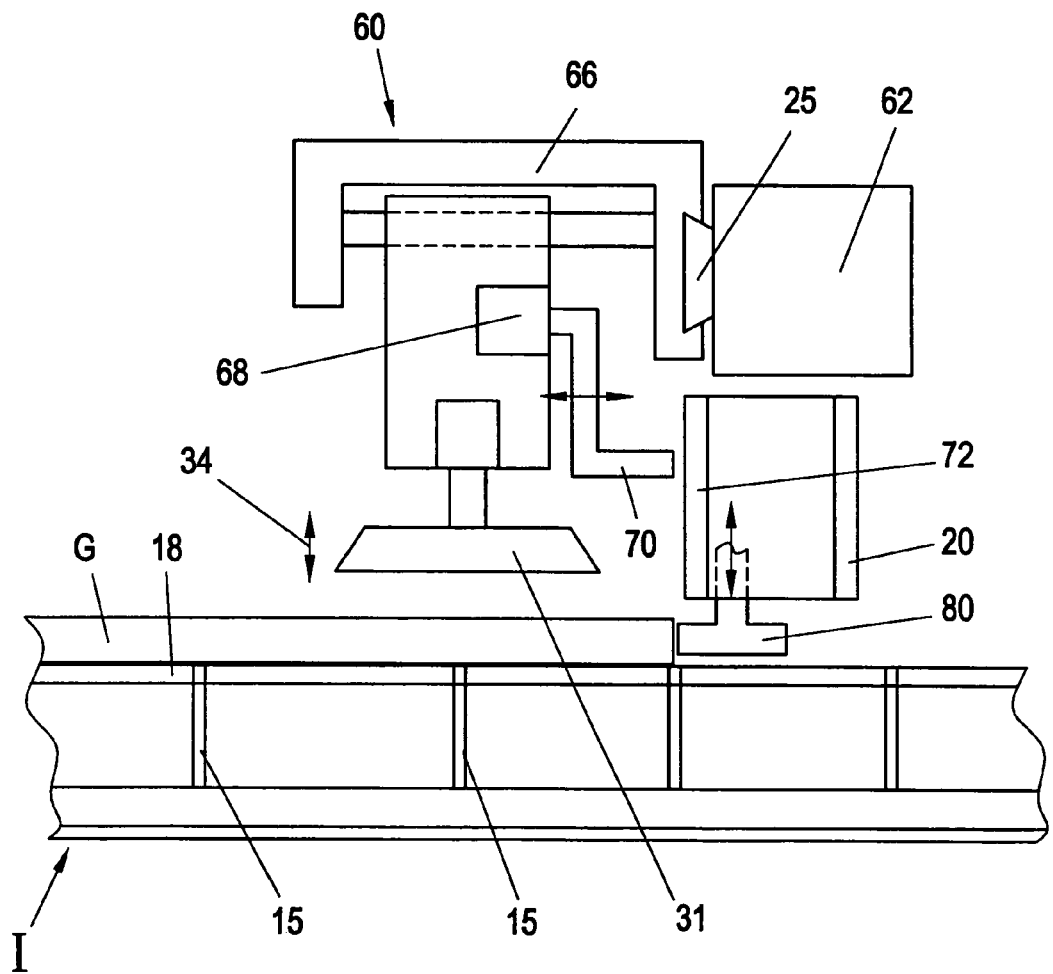

FIG. 3 schematically shows a suction head for coupling a glass sheet in a conveyor belt, FIG. 4 shows a modified embodiment with a second conveyor means in the area in front of the first cutting site, and FIG. 5 schematically shows a suction head on the conveyor device from FIG. 4.

In the embodiments shown in FIGS. 1 to 5 the illustrated unit for cutting laminated glass is made. This means that at each cutting site there are not only means for scratching the laminated glass from overhead and underneath, but also means for breaking the scratched laminated glass and for cutting the plastic film between the two panes of glass of the laminated glass.

If the unit as claimed in the invention is designed as one for cutting of normal glass, it is generally such that the scratching of the glass sheet along the cutting contour takes place separately from the breaking of the scratched glass sheets which is carried out at the cutting sites A, B into glass shapes as is described for example in US 5 857 603 A. The cutting unit for laminated glass on the one hand has a table I on which glass sheets are placed in the direction of the arrow 10. The table I can also be folded up around its inlet-side edge 11 so that on it glass sheets from a glass sheet storage are set up on support hooks 12 on this edge 11 and then by folding back the table 1 into the initial position which is essentially horizontal they can be shifted.

On the edge 13 which is opposite the edge 11 which is equipped with the hook 12 the table I adjoins a stationary strip 14.

The table I and the stationary strip 14 are preferably made as an air cushion table. i.e. there are openings 15 distributed over their support surfaces, out of which compressed air flows so that a glass sheet lying on the table I floats on an air cushion.

The support surface of the Table 1 can be equipped for example with rollers like the tables II and II still to be explained on its support surface.

The table I, more accurately its support surface, is tilted in its base position (initial position) down towards the contact edge 12 or can be tilted around the edge 13 which lies in the area of the joint 16 between the table I and the strip 14, in order to align the table I such that it is tilted down towards the contact edge 21. For example, the edge 11 of the table I equipped with the hooks 12 is higher or can be raised so that the table I slopes down in the direction to the strip 14. A glass sheet which lies on the table I which is tilted beforehand or which is slanted by tilting slides on the table I, for example on an air cushion, "down" until it rests against the contact edge 21 which is formed by the strand 22 of the conveyor belt 20. This contact edge 21 which is formed by the conveyor belt 20 forms a reference line and defines the location of the glass sheet before it is moved to the cutting site A (cutting device for glass or laminated glass).

If the support surface of the table I is tilted down towards the contact edge 21 in the initial position, the cutting device A is likewise tilted and with the horizontal includes the same angle as the table I (it rises away from the contact edge 21).

For reliable movement of the glass sheets on the table I (and the other tables II and III) small angles are sufficient, especially in air cushion tables. For example the edge 11 of the table I for a table length of 3–5 m can be roughly 2 cm higher than the edge 13. To move the glass sheet G on the table I in the direction to the cutting site A (compare FIG. 3), on a frame-mounted guide rail 25 which is aligned parallel to the conveyor belt 20 at least one carriage 30 on which at least one suction head 31 is located is guided to be able to move freely. The suction head 31 can be lowered for resting against the glass sheet G which lies on the support surface of the table I which is formed for example by a felt layer 18 by a hydraulic motor 33 which is installed in the carriage 30 (arrow 34, FIG. 3) and can then be loaded using another (arrow 35, FIG. 3) hydraulic motor 32 which is installed in the carriage 30 such that it pulls the glass sheet G against the strand 22 of the conveyor belt 20 which forms the contact edge 21 (reference line), by which the glass sheet G is coupled by force-fit to the conveyor belt 20. By moving the conveyor belt 20 the glass sheet G can be moved on the table I, the friction being kept small by the air cushion of the table I. Just before the cutting point A on the table I there is a device 35 which detects the front edge of a glass sheets which is to be moved in order to define the reference position. Instead of this device there can also be a simple stop which is moved away after fixing the reference position, for example, lowered.

By moving the conveyor belt 20 with which the glass sheet is coupled via the carriage 30 to the suction head 31 (there can be a separate drive for the carriage 30, but it is generally not essential), the glass sheet is moved gradually to the cutting point A and X cuts (traverses) are made in the glass sheet. The extent of feed of the glass sheet G to the cutting point A is detected with a path transducer which is coupled to the conveyor belt 20, especially to its drive (incremental transducer) and based on the paths of the glass sheet which have been detected in this way it is aligned relative to the cutting site A such that it is cut at the desired site. Before displacement of the glass sheet G starts, the table I is moved (tilted) into its location which is parallel to the alignment of the cutting site A.

The resulting glass strips (glass shapes) travel onto the table II. This table II is aligned in its base position which it assumes when executing the cutting processes at the cutting site A in a plane with the table I, i.e. it is tilted to the horizontal by the same angle as Table I and the cutting device of the cutting site A, its also sloping down towards its contact edge. This alignment of the table II can also be induced by lifting in the area of the its edge 40 which is adjacent to the cutting site A.

To convey a glass sheet shape away from the cutting site A the Table II can be inclined after each cutting process which is executed at the cutting site A such that the glass sheet shape on the table II which now is also aligned sloping down away from the cutting site A or its edge 40 slides out of the position located first directly to the right next to the cutting site A into the position shown by the broken line in the drawings. To do this the table II is raised in the area of the edge 40 which is located next to the cutting site A.

In addition, the table II in the area of its edge 41 can also be raised so that a glass sheet shape slides reliably on the table II in contact with the two contact edges 44, 45 which are the two strands of the conveyor belts 20. Thus, the one corner of the glass sheet shape is located at a reference point 43, in the example the intersection point of the two contact edges 44, 45. At this instant the corner which forms the reference point 43 is the lowest point of the table II since (as a result) the corner of the table II has been raised.

A limit switch 47 establishes that a glass sheet shape rests on the reference edge 45. As soon as this is ascertained, the edge 40 which is adjacent to the cutting site A and also the edge 41 of the table II which is normal thereto is lowered so that the table II is again aligned flush with the table I (lying in one plane).

In this embodiment, on the two contact edges 44, 45 of the table II there are conveyor belts 20 to which suction heads 31 on carriages 30 (compare FIG. 3) are assigned, as was described above for Table 1. The suction head 31 on the contact edge 45 of the table II which is normal to the cutting site B and which is opposite (away from) and parallel to the cutting site A is essential since via this carriage 30 with at least one suction head 31 and the assigned conveyor belt 20 a glass sheet/glass sheet shape is gradually transported to the cutting site B (second cutting device) in order to execute the cutting processes in the Y direction. There can also be a sensor 35 for detecting the forward edge of the glass sheet shape in front of the cutting site B.

The conveyor belt 20 on the contact edge 44 of the table II perpendicular to the cutting site A is designed essentially to support the motion of a glass sheet shape to the reference point 43, especially when a glass sheet shape is to be tilted and should rest with one or two corners on one or two conveyor belts 20 which form the contact edges 44, 45. The carriage 30 which is provided in the embodiment from FIG. 1 at the contact edge 41 with the suction head 31 is not absolutely necessary and is generally not provided.

The table III which is located following the cutting site B is flush with the table II and is first tilted rising away from the cutting site B. It is important that the tables II and III lie in a (single) (for example tilted) plane. In order to facilitate the removal of the glass sheet shape obtained after cutting by the cutting site B, the table III can even be lowered after executing the cutting process in the area of its edge 50. In the table III lifting strips 55 can also be recessed for tilting the glass sheet shape up. In the embodiment shown in FIG. 1 on each of the contact edges 21 and 45 there are carriages 30 with at least one suction head 31 (on the carriages 30 there can also be two suction heads 31 each). It should be pointed out that this is a minimum requirement since there can also be two or more carriages 30 with at least one suction head 31 each on the contact edge 21 and/or the contact edge 45 in order to reliably move large and/or heavy glass sheets (compare FIG. 2). Generally however one carriage 30 per contact edge is sufficient, especially when it engages in the middle area of the glass sheet and pulls it with relatively great force against the strand 22 of the respective conveyor belt 20 which forms the contact edge 21, 44, 45 (reference line). If for example there are two carriages 30 (FIG. 2) with at least one suction head 31 each on the contact edges 21 and 45, they can also alternately engage glass sheets or glass sheet shapes.

In order to move the carriages 30 back into their initial position, the respective conveyor belt 20 is reversed, i.e. it runs in the opposite direction and the carriage 30 is coupled via a driver to the conveyor belt 20 by pressing the driver against the conveyor belt 20.

The movement of the tables, especially of the tables II and III, preferably takes place by movement of their frames which are located underneath their support surfaces by hydraulic cylinders which are supported on the bottom engaging the frames.

Figure 1:
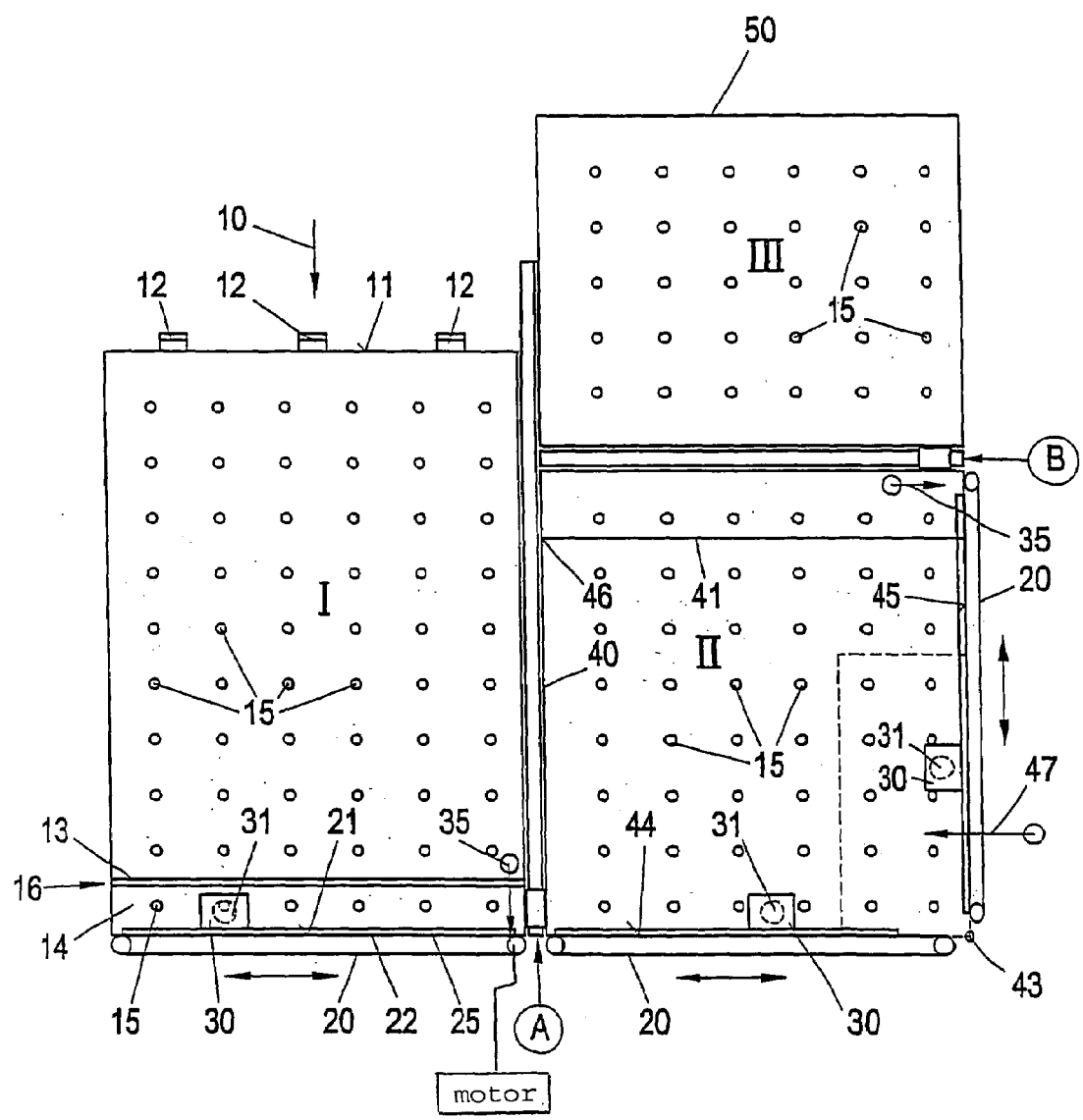
FIG. 1 shows a (laminated) glass cutting unit in an overhead view.
Figure 2:
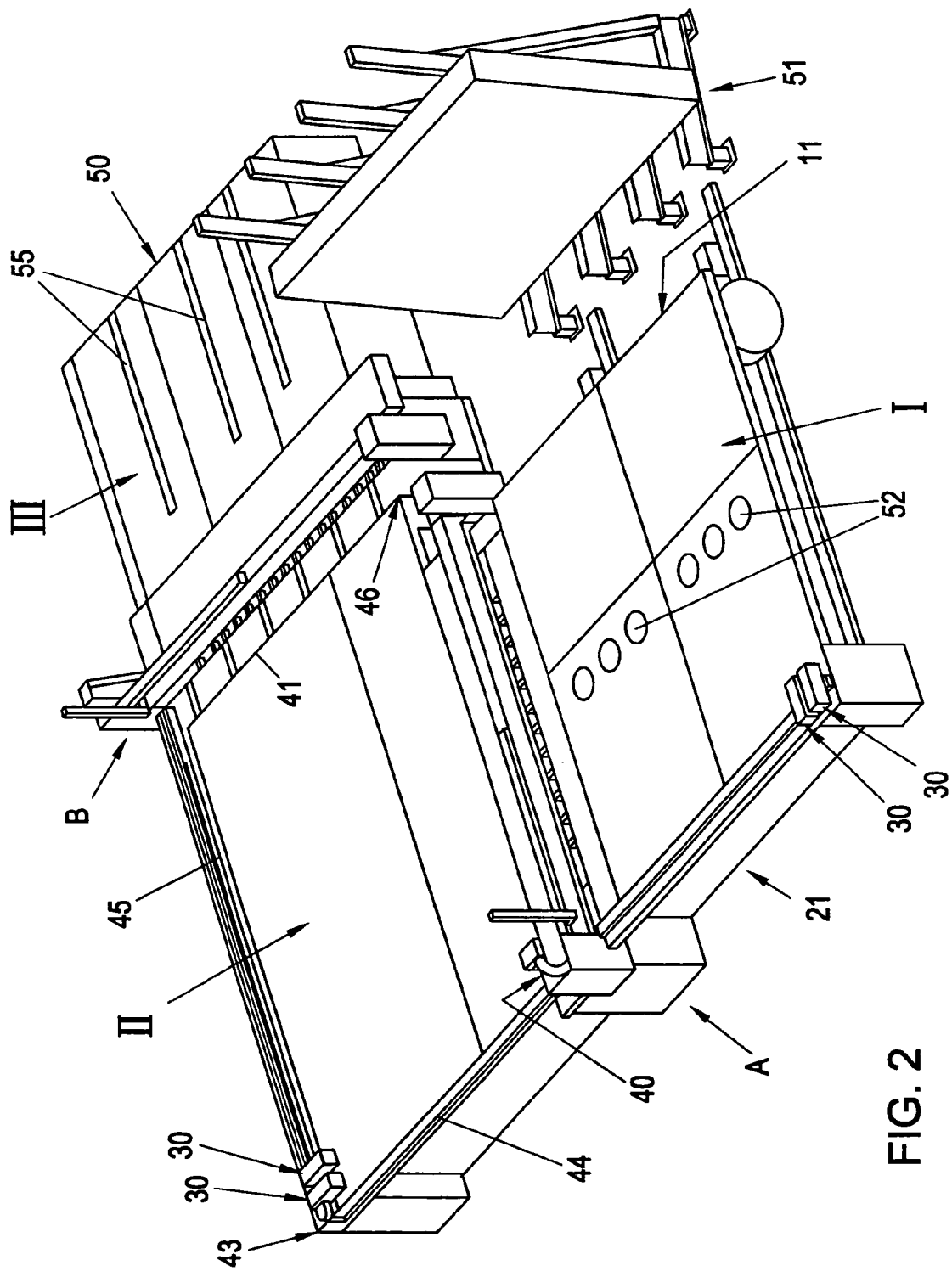
FIG. 2 shows a (laminated) glass cutting unit in an oblique view.

The operating sequence of the (laminated) glass cutting system with tables which can be inclined or which are inclined in their initial position can be described by way of example with reference to FIG. 2 as follows:

1. Table 1 is folded up around its edge 11 to accept a glass sheet from a stack 51 of glass sheets. The glass sheet is fixed on the table I via several suction heads 52.

2. The table I is folded back into the initial position which slopes down toward the contact edge 21. The glass sheet then slides on the air cushion toward the contact edge 21.

3. In this position the glass sheet is coupled by force-fit to the conveyor belt 20 by the suction head 31 on the carriage 30 (or by the suction heads on the two carriages).

4. By actuating the conveyor belt 20 the glass sheet is advanced until it is correctly aligned relative to the cutting device A for one cutting process.

5. Then, when the tables I and II are flush with one another (both are tilted down towards the contact edge 21 and 44) the glass sheet shape is cut by the cutting device of the cutting site A. The resulting glass sheet shape ("traverse") lies on the table II.

6. The table II is raised in the area of its edge 40 which is adjacent to the cutting site A so that it also slopes down obliquely toward the contact edge 45.

7. The glass sheet shape moves (slides) on the table II into the position in which it adjoins the contact edge 45 and the contact edge 44.

8. By raising the table II in the area of its edge 41 adjacent to the cutting site B the table II is tilted such that its corner between the contact edges 44, 45 is the lowest point. This ensures that the glass sheet shape with its corner is located at the reference point 43 and adjoins the contact edges 44, 45 with two edges which run towards its corners.

9. When the glass sheet shape moves on the table II the conveyor belt 20 is actuated in order to support this motion, especially when the glass sheet shape is inclined.

10. The glass sheet shape on the conveyor belt 20 in the area of the contact edge 45 is fixed by force-fit by the suction head 31 on the carriage 30 in the area of the contact edge 45, while it is located with its corner at the reference point 43.

11. The table II is moved back into its initial position which is flush with the table I and which declines towards the contact edge 44. The table II therefor rises toward the cutting site B in this position from the contact edge 44 toward the edge 41.

12. By actuating the conveyor belt 20 the glass sheet shape is advanced towards the cutting site B.

13. The glass sheet shape is further cut into shapes by the cutting device at the cutting site B.

14. During this cutting process the tables II and III are aligned rising in a plane from the contact edge 44 of the table II toward the edge 50 of the table III.

15. To remove the shapes which are formed following the cutting site B the table III can be tilted such that it is aligned sloping down from the cutting site B toward the edge 50. Using the lifting strips 55 glass sheet shapes can be lifted off the table III and can be aligned essentially vertically.

In the embodiment shown in FIG. 4 in the area of the support surface of the table I there is another conveyor device 60. This additional conveyor device 60 can be used to move the glass sheet to the first cutting site A in combination with the conveyor device with the conveyor belt 20 and the suction head 30. The second conveyor means 60 can however also be used to move another glass sheet to the cutting site A at the same time or independently of the transport of a glass sheet by the conveyor device 20 with the suction head 30 on contact surface 21.

In particular the second conveyor means 60 in the area over the support surface of the table I is built as follows: On the beam 62 which is mounted stationary on the table I there is a continuously turning conveyor belt 20 for example in the form of a toothed belt at a distance over the support surface of the table I with a contact surface 21 which is aligned essentially normally to the support surface I. Above the conveyor belt 20 on the beam 62 which can be mounted on the one hand on the table I and on the other on the beam 64 of the cutting site A there is a guide rail 25 for (at least) one carriage 66. This carriage 66 bears at least one suction head 31 which can be lowered onto a glass sheet G which lies on the support surface of the table I (arrow 34). Here the arrangement of the conveyor belt 20 is such that it has a distance from the support surface of the table I which is so great that the thickest glass sheet G can be moved through under it.

In order to couple the carriage 66 to the suction head 31 with the conveyor belt 20, on the carriage 66 there is a hydraulic motor 68 which presses a plunger 70 against the strand 72 of the conveyor belt 20 which is adjacent to the carriage 66 so that the carriage moves with the conveyor belt and thus also a glass sheet G on which the suction head 31 of the carriage 66 has been placed is entrained.

In order to align a glass sheet G parallel to the direction of motion of the conveyor belt 20, there can be lowerable stops 80, for example contact pins, which define a "zero line" (reference line) and against which the glass sheet G is brought into contact.

It goes without saying that instead of one carriage 66 with at least one suction head 31 there can also be two or more carriages 66 each with at least one suction head 31 in order to enable safe transport of glass sheets G by the additional conveyor means 60 in the area of the support surface of the table I.

In one modified embodiment the conveyor means 60 can be adjustable instead of stationary so that its distance from the contact edge 21 which is formed by the conveyor belt 20 can be changed.

In summary, one embodiment of the invention can be described as follows:

In a system for cutting glass sheets into glass sheet shapes there is at least one cutting site A, B. In order to align the glass sheet which is to be cut or the glass sheet shape into a defined position, on the edge of the tables I and II there are contact edges 21, 44, 45. In order to move the glass sheets and the glass sheet shapes into contact with the contact edges 21, 44, 45 the tables I, II are aligned sloping down toward the contact edges 21, 44, 45 so that the glass sheets and glass sheet shapes slide on air cushions produced between the glass sheets or glass sheet shapes and the tables I, II in contact with the contact edges 21, 44, 45. The glass sheets or glass sheet shapes which adjoin the contact edges 21, 45 are coupled by force-fit to the conveyor belts 20 which are provided in the area of the contact edges 21, 45 and then moved to the cutting site A, B which is located following the table I, II. When there are two cutting sites A, B the table II can be inclined between the two cutting sites A, B such that the intersection point which is used as the reference point 43 between the two contact edges 44, 45 is the lowest point of the table II.

The invention claimed is:

1. An apparatus for supporting and cutting glass, comprising:
   a cutting device;
   a plurality of support surfaces arranged on opposite sides of the cutting device;
   a first conveyor arranged along an edge of at least one of the support surfaces, the first conveyor including at least one belt oriented to contact an edge of a glass sheet positioned over one of said plurality of support surfaces, the first conveyor further including a drive mechanism for said belt that drives said belt and directly urges a glass sheet toward said cutting device; and
   at least one suction head adapted to engage a glass sheet and to urge the glass sheet across at least one of the support surfaces and into contact with the first conveyor, so that the first conveyor drives the glass sheet and the attached at least one suction head to a cutting position that allows the cutting device to cut the glass sheet.

2. The apparatus of claim 1, wherein the first conveyor is aligned normally to the cutting device, the cutting device being adjacent to one of the support surfaces.

3. The apparatus of claim 1, wherein the belt comprises a first continuous conveyor belt.

4. The apparatus of claim 3, wherein the at least one suction head comprises at least one driver (31) constructed so as to be able to engage a surface of the glass sheet (G) facing away from one of the support surfaces and to load the glass sheet against the first conveyor belt.

5. The apparatus of claim 1, wherein the at least one suction head comprises a drive separate from the drive mechanism of the first conveyor, for urging an attached glass sheet toward said cutting position.

6. The apparatus of claim 1, wherein the at least one suction head does not have its own drive for urging an attached glass sheet toward said cutting position, such that movement of said at least one suction head toward said cutting position is caused solely by the movement of an attached glass sheet driven by said first conveyor.

* * * * *